United States Patent
Coulter et al.

(10) Patent No.: US 8,010,759 B1
(45) Date of Patent: Aug. 30, 2011

(54) EXTENT REDIRECT

(75) Inventors: Timothy R. Coulter, Morgan Hill, CA (US); Raghu Krishnamurthy, Cupertino, CA (US); Par A. Botes, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 152 days.

(21) Appl. No.: 11/541,006

(22) Filed: Sep. 29, 2006

Related U.S. Application Data

(63) Continuation-in-part of application No. 10/881,320, filed on Jun. 30, 2004.

(51) Int. Cl.
*G06F 12/00* (2006.01)
*G06F 13/00* (2006.01)
*G06F 13/28* (2006.01)

(52) U.S. Cl. ........................... 711/162; 711/154

(58) Field of Classification Search .................. 711/154, 711/161–162
See application file for complete search history.

(56) References Cited

U.S. PATENT DOCUMENTS

| | | | | |
|---|---|---|---|---|
| 6,732,293 B1 * | 5/2004 | Schneider | ....................... | 714/15 |
| 7,257,606 B2 * | 8/2007 | Kapoor et al. | ................. | 707/205 |
| 2002/0112134 A1 * | 8/2002 | Ohran et al. | ................... | 711/162 |
| 2002/0129047 A1 * | 9/2002 | Cane et al. | ..................... | 707/204 |
| 2003/0005235 A1 * | 1/2003 | Young | ........................... | 711/141 |
| 2006/0174074 A1 * | 8/2006 | Banikazemi et al. | .......... | 711/162 |
| 2007/0226444 A1 * | 9/2007 | Yagawa | ........................ | 711/170 |

OTHER PUBLICATIONS

Andrew Tanenbaum, Structured Computer Organization, 1984, Prentice Hall, pp. 10-12.*

* cited by examiner

*Primary Examiner* — Kevin L Ellis
*Assistant Examiner* — Ryan Bertram
(74) *Attorney, Agent, or Firm* — Campbell Stephenson LLP

(57) ABSTRACT

Redirecting a data object such as a file block extent. The data object can be redirected from a first memory block to a second memory block, wherein the second memory block includes a copy of modified data of the first memory block. The redirection may occur in response to a request to modify data of the data object. Redirection preserves the prior version of the data object stored in the first memory block to enable restoration of the data object if needed. In one embodiment, a first data object is mapped to a first memory block. A copy of data contents of the first memory block is created. Thereafter, data contained within the copy is modified in accordance, for example, with a request to write data to the first data object. The modified copy is stored in a second memory block, and the first data object is mapped to the second memory block.

33 Claims, 9 Drawing Sheets

T=T0    File m

| | A0 | B0 | C0 |
|---|---|---|---|
| Extent Block # | 1 | 2 | 3 |

AT_m

| Entry | Extent Block # | Volume V Block# | Time Stamp | C |
|---|---|---|---|---|
| 1 | 1 | 1 | T0 | 1 |
| 2 | 2 | 2 | T0 | 1 |
| 3 | 3 | 3 | T0 | 1 |

File n

| | D0 | E0 |
|---|---|---|
| | 1 | 2 |

AT_n

| Entry | Extent Block # | Volume V Block# | Time Stamp | C |
|---|---|---|---|---|
| 1 | 1 | 4 | T0 | 1 |
| 2 | 2 | 5 | T0 | 1 |

File m
| A0 | B0 | C0 |
|----|----|----|
| 1  | 2  | 3  |

Extent Block #

$AT_m$

| Entry | Extent Block # | Volume V Block# | Time Stamp | C |
|-------|----------------|-----------------|------------|---|
| 1     | 1              | 1               | T0         | 1 |
| 2     | 2              | 2               | T0         | 1 |
| 3     | 3              | 3               | T0         | 1 |

File n
| D0 | E0 |
|----|----|
| 1  | 2  |

$AT_n$

| Entry | Extent Block # | Volume V Block# | Time Stamp | C |
|-------|----------------|-----------------|------------|---|
| 1     | 1              | 4               | T0         | 1 |
| 2     | 2              | 5               | T0         | 1 |

File m
| A0 | B1 | C0 |
|----|----|----|
| 1  | 2  | 3  |

Extent Block #

$AT_m$

| Entry | Extent Block # | Volume V Block# | Time Stamp | C |
|-------|----------------|-----------------|------------|---|
| 1     | 1              | 1               | T0         | 1 |
| 2     | 2              | 2               | T0         | 0 |
| 3     | 3              | 3               | T0         | 1 |
| 4     | 2              | 6               | T1         | 1 |

File n
| D0 | E0 |
|----|----|
| 1  | 2  |

$AT_n$

| Entry | Extent Block # | Volume V Block# | Time Stamp | C |
|-------|----------------|-----------------|------------|---|
| 1     | 1              | 4               | T0         | 1 |
| 2     | 2              | 5               | T0         | 1 |

File m

| A0 | B1 | C0 |
|----|----|----|
| 1  | 2  | 3  |

Extent Block #

$AT_m$

| Entry | Extent Block # | Volume V Block# | Time Stamp | C |
|-------|----------------|-----------------|------------|---|
| 1     | 1              | 1               | T0         | 1 |
| 2     | 2              | 2               | T0         | 0 |
| 3     | 3              | 3               | T0         | 1 |
| 4     | 2              | 6               | T1         | 1 |

FIG. 3C

File n

| D0 | E1 | F |
|----|----|---|
| 1  | 2  | 3 |

$AT_n$

| Entry | Extent Block # | Volume V Block# | Time Stamp | C |
|-------|----------------|-----------------|------------|---|
| 1     | 1              | 4               | T0         | 1 |
| 2     | 2              | 5               | T0         | 0 |
| 3     | 2              | 7               | T2         | 1 |
| 4     | 3              | 8               | T2         | 1 |

T=T3

File m

| A1 | B1 | C0 |
|----|----|----|
| 1  | 2  | 3  |

Extent Block #

$AT_m$

| Entry | Extent Block # | Volume V Block# | Time Stamp | C |
|-------|----------------|-----------------|------------|---|
| 1     | 1              | 1               | T0         | 0 |
| 2     | 2              | 2               | T0         | 0 |
| 3     | 3              | 3               | T0         | 1 |
| 4     | 2              | 6               | T1         | 1 |
| 5     | 1              | 9               | T3         | 1 |

FIG. 3D

File n

| D0 | E1 | F |
|----|----|---|
| 1  | 2  | 3 |

$AT_n$

| Entry | Extent Block # | Volume V Block# | Time Stamp | C |
|-------|----------------|-----------------|------------|---|
| 1     | 1              | 4               | T0         | 1 |
| 2     | 2              | 5               | T0         | 0 |
| 3     | 2              | 7               | T2         | 1 |
| 4     | 3              | 8               | T2         | 1 |

T=T4 — File m: A1 | B2 | C0 ; AT_m: 1, 2, 3

| Entry | Extent Block # | Volume V Block# | Time Stamp | C |
|---|---|---|---|---|
| 1 | 1 | 1 | T0 | 0 |
| 2 | 2 | 2 | T0 | 0 |
| 3 | 3 | 3 | T0 | 1 |
| 4 | 2 | 6 | T1 | 0 |
| 5 | 1 | 9 | T3 | 1 |
| 6 | 2 | 10 | T4 | 1 |

File n: D0 | E1 | F ; AT_n: 1, 2, 3

| Entry | Extent Block # | Volume V Block# | Time Stamp | C |
|---|---|---|---|---|
| 1 | 1 | 4 | T0 | 1 |
| 2 | 2 | 5 | T0 | 0 |
| 3 | 2 | 7 | T2 | 1 |
| 4 | 3 | 8 | T2 | 1 |

*FIG. 3E*

T=T5 — File m: A1 | B2 | C0 ; AT_m: 1, 2, 3

| Entry | Extent Block # | Volume V Block# | Time Stamp | C |
|---|---|---|---|---|
| 1 | 1 | 1 | T0 | 0 |
| 2 | 2 | 2 | T0 | 0 |
| 3 | 3 | 3 | T0 | 1 |
| 4 | 2 | 6 | T1 | 0 |
| 5 | 1 | 9 | T3 | 1 |
| 6 | 2 | 10 | T4 | 1 |

File n: D0 | E1 | F1 ; AT_n: 1, 2, 3

| Entry | Extent Block # | Volume V Block# | Time Stamp | C |
|---|---|---|---|---|
| 1 | 1 | 4 | T0 | 1 |
| 2 | 2 | 5 | T0 | 0 |
| 3 | 2 | 7 | T2 | 1 |
| 4 | 3 | 8 | T2 | 0 |
| 5 | 3 | 11 | T5 | 1 |

File m

| A1 | B1 | C0 |
|----|----|----|
| 1  | 2  | 3  |

Extent Block #

$AT_m$

| Entry | Extent Block # | Volume V Block# | Time Stamp | C |
|-------|----------------|-----------------|------------|---|
| 1     | 1              | 1               | T0         | 0 |
| 2     | 2              | 2               | T0         | 0 |
| 3     | 3              | 3               | T0         | 1 |
| 4     | 2              | 6               | T1         | 1 |
| 5     | 1              | 9               | T3         | 1 |
| 6     | 2              | 10              | T4         | 0 |

File n

| D0 | E1 | F |
|----|----|---|
| 1  | 2  | 3 |

$AT_n$

| Entry | Extent Block # | Volume V Block# | Time Stamp | C |
|-------|----------------|-----------------|------------|---|
| 1     | 1              | 4               | T0         | 1 |
| 2     | 2              | 5               | T0         | 0 |
| 3     | 2              | 7               | T2         | 1 |
| 4     | 3              | 8               | T2         | 1 |
| 5     | 3              | 11              | T5         | 0 |

*FIG. 3G*

EXTENT REDIRECT

CROSS-REFERENCE TO RELATED APPLICATIONS

The present patent application is a continuation-in-part of U.S. patent application Ser. No. 10/881,320, filed on Jun. 30, 2004, entitled "Using Roll-Forward and Roll-Backward Logs to Restore a Data Volume" and is incorporated by reference herein in its entirety and for all purposes.

BACKGROUND OF THE INVENTION

Businesses or other entities often store data (e.g., customer lists, financial transactions, business documents, business transactions, etc.) in files of a file system. File systems, in turn, are usually stored on one or more logical data volumes. The present invention will be described with reference to a file system that is stored on a single data volume, it being understood that the present invention should not be limited thereto.

File memory space is divided into extents for storing data of respective files of a file system. Each extent is defined by a starting address in the file memory space and an extent length. File extents are typically divided into extent blocks of equal size. Each extent stores or is able to store a portion of data of an associated file. In the configuration where the file system is stored on a data volume, each file extent block is mapped to a respective block of the data volume. While it is said that each extent block of a file stores data, the data is stored in a respectively allocated block of the data volume.

Data, including data stored in files, is susceptible to corruption. Programming errors unintentionally added into a poorly developed software application may inadvertently corrupt data in files upon which the software application operates. Further, users often unwittingly delete or overwrite important data. Data corruption can be devastating to a business, including those that rely heavily on electronic commerce. Recognizing the importance of maintaining reliable data, businesses or other entities typically employ backup and restore systems to protect themselves against unexpected data corruption. The present invention will be described with reference to restoring a file system using backup copies of a data volume upon which the file system is stored, it being understood that the present invention should not be limited thereto.

Backup systems can create a copy (i.e., backup copy) of a data volume at a point-in-time. One method of creating a backup copy is to copy the data from the volume to one or more magnetic tapes. If data is subsequently corrupted, the volume containing the corrupted data can be replaced in entirety with the most recently created backup copy or backup copies. When replaced, everything that happened to the volume since creation of the backup copy (including the event that caused the data corruption) can be forgotten, and the state of operations (as reflected in the data) is restored to that point-in-time.

Backup operations create backup copies that may be either full or incremental. A full backup copy usually means all data within the volume is copied at the time of backup. An incremental backup usually means that only those blocks of the volume that have changed since some previous event (e.g., a prior full backup or incremental backup) are copied. The backup window (i.e., the time allotted) to complete a full backup, however, tends to be much larger when compared to the backup window for an incremental backup. When backup windows are required to be small, incremental backup is preferable since, in most cases, the number of blocks of the data volume that change between backups is very small compared to the number of blocks in the entire data volume. If backups are done daily or even more frequently, it is not uncommon for less than 1% of blocks of a volume to change between backups. An incremental backup operation in this case copies only 1% of the data that a full backup operation would copy and uses 1% of the input/output (IO) resources needed between the data volume and the backup tapes.

Incremental backup appears to be the preferred mode of protecting important data. And so it is, until a full restore of all blocks of a data volume is needed. A full restore from incremental backups first requires restoring the corrupted data volume to the newest full backup copy, followed by restores to all of the newest incremental backups. That can require a lot of magnetic tape handling performed by, for example, an automated robotic handler. In contrast, restores using just a full backup copy is genuinely simpler and more reliable than restores from combinations of full and incremental backup copies.

While backup and restore systems are useful, they present a number of disadvantages. As noted, backup copies are typically created during backup windows. During backup windows, read and write access to the data volume is denied while the volume is being backed up to one or more magnetic tapes. Additionally, even if a backup copy is created at the top of every hour, a data corruption event that occurs at 12:59 would require the data volume to be restored to the backup copy created at 12:00, and all valid modifications of the data volume entered between 12:00 and 12:59 may be lost.

SUMMARY OF THE INVENTION

Redirecting a data object such as a file block extent is described herein. The data object can be redirected from a first memory block to a second memory block, wherein the second memory block includes a copy of modified data of the first memory block. The redirection may occur in response to a request to modify data of the data object. Redirection preserves the prior version of the data object stored in the first memory block to enable restoration of the data object if needed. In one embodiment, a first data object is mapped to a first memory block. A copy of data contents of the first memory block is created. Thereafter, data contained within the copy is modified in accordance, for example, with a request to write data to the first data object. The modified copy is stored in a second memory block, and the first data object is mapped to the second memory block.

BRIEF DESCRIPTION OF THE DRAWINGS

The present invention may be better understood, and its numerous objects, features, and advantages made apparent to those skilled in the art by referencing the accompanying drawings.

FIGS. 2A-2G show graphical representations of a data volume V;

FIGS. 3A-3G show graphical representations of example files and respective allocation tables;

The use of the same reference symbols in different drawings indicates similar or identical items.

DETAILED DESCRIPTION

The present invention relates to a system or method for restoring a corrupted data storage object (e.g., a file system) to a prior non-corrupted state. Although the present invention will be described with reference to restoring a file system residing on a logical data volume, the present invention may find application in restoring other data storage objects such as databases. Moreover, the present invention may find application to restoring a data storage object that does not reside on logical data storage object (e.g., a data volume). In other words, the present invention may find application to restoring a data storage object that resides directly on physical storage such as hard disks.

In the following description, the preferred embodiment of the present invention can be implemented as a computer program executing on a processor of a computer system, although those skilled in the art will readily recognize that the equivalent of such software may also be constructed in hardware or a combination of hardware and software. If the invention is implemented as a computer program, the program may be stored in a conventional computer readable medium that may include, for example: magnetic storage media such as a magnetic disk (e.g., a disk drive); optical storage media such as an optical disk; solid state electronic storage devices such as random access memory (RAM), or read only memory (ROM); or any other device or medium employed to store computer program instructions.

Figure 1:
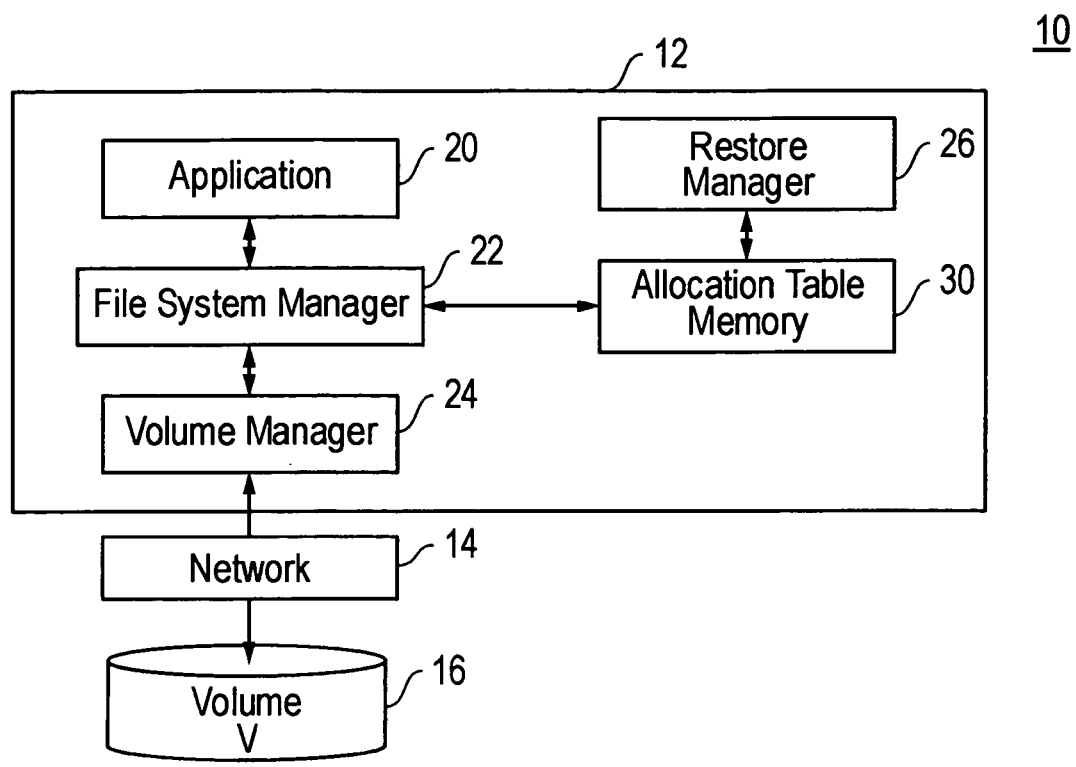
FIG. 1 shows a block diagram of relevant components in a data processing system employing one embodiment of the present invention.

FIG. 1 is a block diagram illustrating relevant components of a system 10 employing one embodiment of the present invention. The system 10 shown in FIG. 1 includes a computer system 12 coupled directly or indirectly to a memory system 16 via a network (e.g., LAN or WAN) 14. Computer system 12 can be any computer or other data processing device. For example, computer system 12 may take form in a conventional personal computer, a server, a special purpose computer, or the like. For purposes of explanation, computer system 12 takes form in a server having one or more processors for executing instructions stored in memory (not shown). Memory system 16 may take form in one or more disk arrays or other storage devices, it being understood that the term "memory system" should not be limited thereto. For purposes of explanation, it will be presumed that memory system 16 takes form in a single disk array that stores a data volume V. As will be more fully described below, a file system F is stored on volume V.

With continuing reference to FIG. 1, server 12 executes instructions stored in one or more memories to implement application 20, file system manager 22, volume manager 24, and restore manager 26, the functions of which are more fully described below. Server 12 also includes an allocation table memory 30 for storing one or more allocation tables. For purposes of explanation, the present invention will be described with memory 30 storing an allocation table AT(x) for each File x of file system F. Allocation tables may be used for many purposes, one of which is to map extent blocks of a file to respective blocks of volume V. In an alternative embodiment, one allocation table may be employed to map extent blocks of all files to respective blocks of volume V.

Figures 2A, 2B, 2C, 2D, 2E, 2F, 2G:
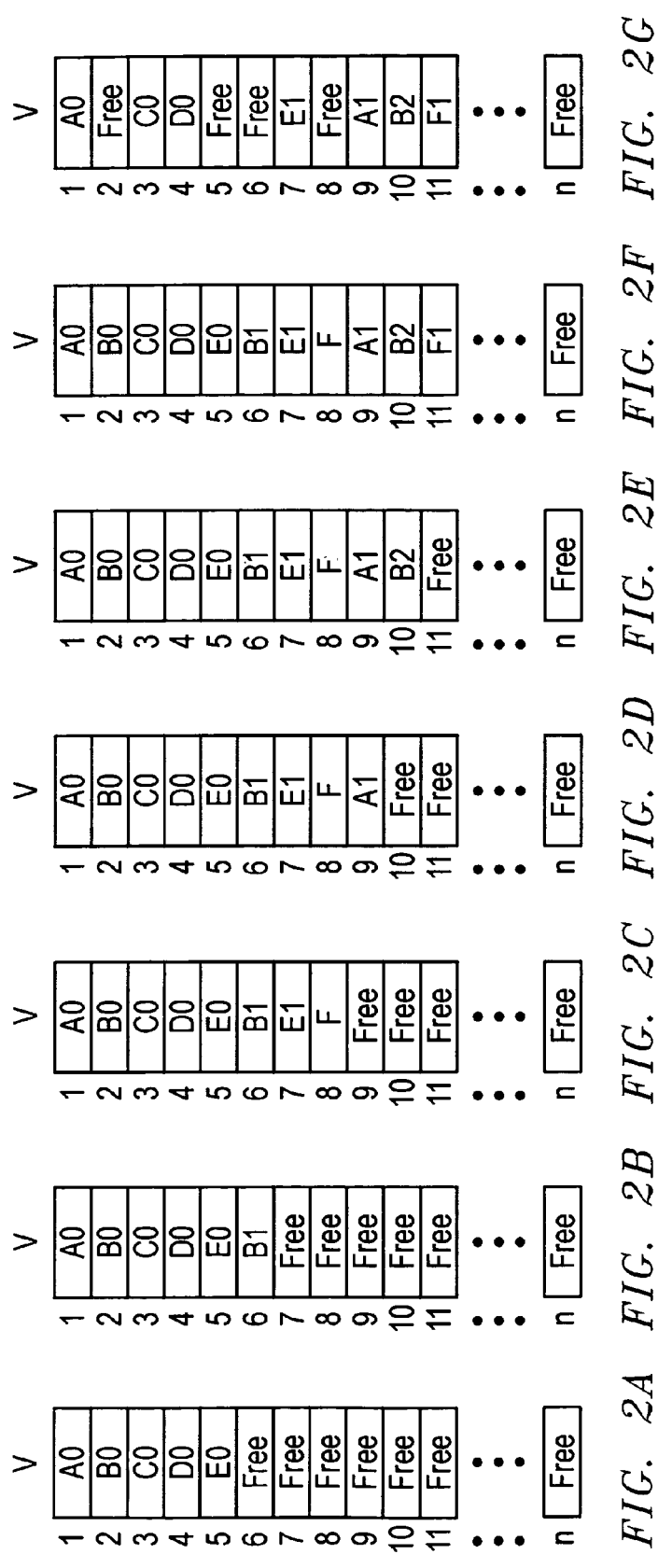

Volume manager 24 manages volume V stored on the disk array 16. FIG. 2A is a graphical representation of volume V at an initial time T0. Volume V consists of $n_{max}$ logical data blocks, each storing data or available to store data. Logical data blocks of volume V do not actually store data; rather, physical memory blocks of hard disks within disk array 16 are allocated directly or indirectly to store data of respective data blocks of volume V. Although not shown, a table may be accessible to volume manager 24 that maps logical blocks of volume V to respective physical blocks of hard disks within disk array 16. Each of the $n_{max}$ blocks shown in FIG. 2A stores or is able to store a predetermined amount (e.g., 512 bytes) of data. Blocks 1-5 of volume V in FIG. 2A stores data designated A0-E0, respectively, while blocks 6-$n_{max}$ are designated "Free" or available for allocation to store data. Although not shown, volume manager 24 may maintain a list that identifies by block number those blocks in volume V that are "Free."

File system manager 22 manages file system F, which consists of multiple files or directories that contain multiple files. File system manager 22 may create metadata and allocate an extent in file system memory space for each file. Metadata may include a starting address of the file's extent and its overall length. Each extent may consist of a number of contiguous extent blocks. FIG. 3A illustrates example files (File m and File n) of file system F. File m consists of extent blocks 1, 2 and 3 containing File m data represented as A0, B0, and C0, respectively, while File n consists of extent blocks 1 and 2 that store File n data represented as D0 and E0, respectively. FIG. 3A illustrates contents of Files m and n at initial time T=T0. For purposes of explanation, a file extent block stores or is able to store the same amount of data (e.g., 512 bytes) that is stored within a block of volume V. As noted above, file system F is stored on volume V. In this configuration, data contained in file extent blocks are stored in respective blocks of volume V mapped thereto, which in turn are mapped to respective physical memory blocks of hard disks in memory 16. In other words, data stored in file extent blocks are indirectly stored in respective physical memory blocks of hard disks in memory 16 via respective blocks of volume V.

With continuing reference to FIGS. 1, 2A, and 3A, when a file is created, file system manager 22 may create a corresponding allocation table in memory 30. FIG. 3A illustrates example allocation tables ATm and ATn for Files m and n, respectively. Each of the allocation tables includes one or more entries. Each entry maps an extent block of a file to a respective block of volume V. For example, entry 1 of allocation table ATn maps extent block 1 of File n to block 4 of volume V, which means that data of extent block 1 is stored in volume block 4. It is noted that volume V shown in FIG. 2A is consistent with the mappings of ATm and ATn shown in FIG. 3A. In other words, block numbers 1-5 of volume V store data designated A0-E0, respectively.

Each entry of an allocation table stored in memory 30 includes a current value C set to logical 1 or logical 0. As will be more fully described below, each allocation table AT(x) may have more than one entry for each extent block. Thus, two or more volume V blocks may be allocated to store different versions of data for a file extent block that existed at different points in time. However, only one of the two or more volume blocks is considered to store "current" data for the extent block. The current value C identifies which of two or more blocks of volume V store current data. As will be more fully described below, only current data should be used by file system manager 22 during a read or write operation. Allocation tables ATm and ATn of FIG. 3A show current value C set to logical 1 for each entry, which means that each entry of the allocation tables map to volume V blocks containing current data. Each entry also includes a time stamp TS that identifies when the entry was created by file system manager 22. Allocation tables ATm and ATn of FIG. 3A show time stamps TS=T0. Allocation tables, as will be more fully described below may be subject to modification when data is written to files or when files are restored to a prior data state.

Figure 4:
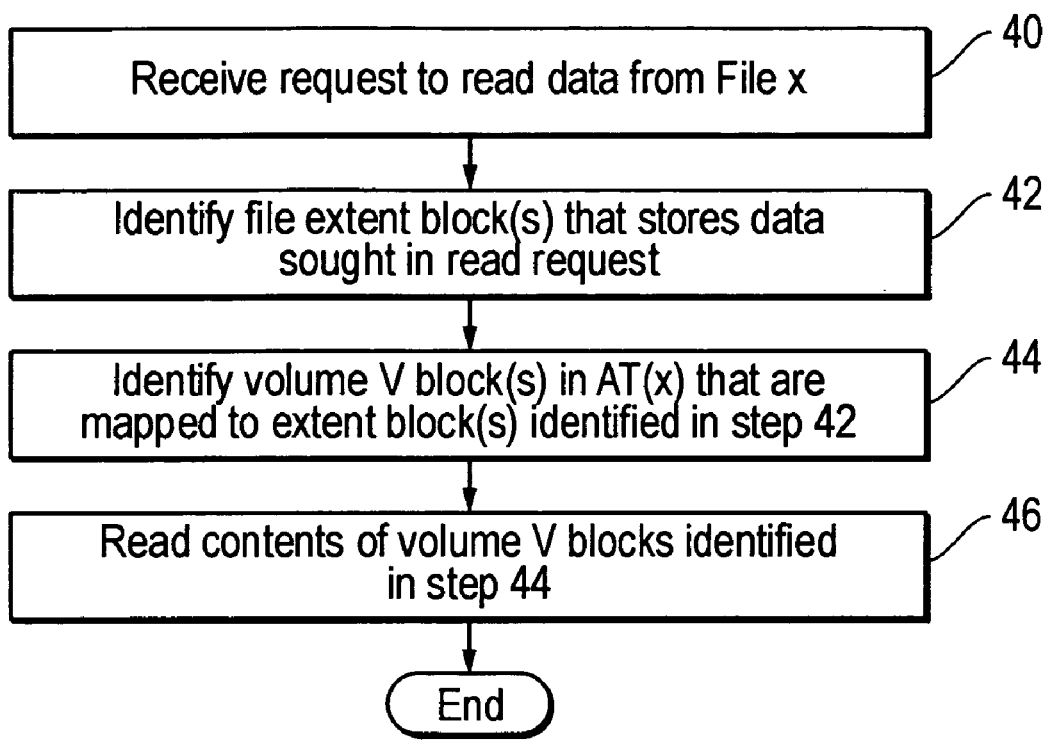
FIG. 4 illustrates relevant aspects of a process for reading file data in accordance with one embodiment of the present invention.

Allocation tables can direct file system manager 22 to the volume V blocks that store current data of a file when the file system manger implements a request to read data from or write data to that file. FIG. 4 illustrates operational aspects of a process that may be performed by file system manager 22 when implementing a request to read data from File x, where x is a variable. The process shown in FIG. 4 initiates when file system manager 22 receives the read request from application 20. In step 42 file system manager 22 can access metadata (not shown) for File x in order to identify the file extent block(s) by number that contain the requested data. In step 44, file system manager 22 may then access allocation table AT(x) (corresponding to File x) to identify the block(s) by number of volume V mapped to the extent block(s) identified in step 42. As noted above, however, allocation table AT(x) may have more than one entry that maps a file extent block identified in step 42. If so, file system manager 22 reads the identity (i.e., block number) of the volume block in the entry from allocation table AT(x) with its current value C set to logical 1. Ultimately, the data contents of the block(s) of volume V identified in step 44 are returned to file system manager 22 for subsequent processing in accordance with the read request of step 40.

Figure 5:
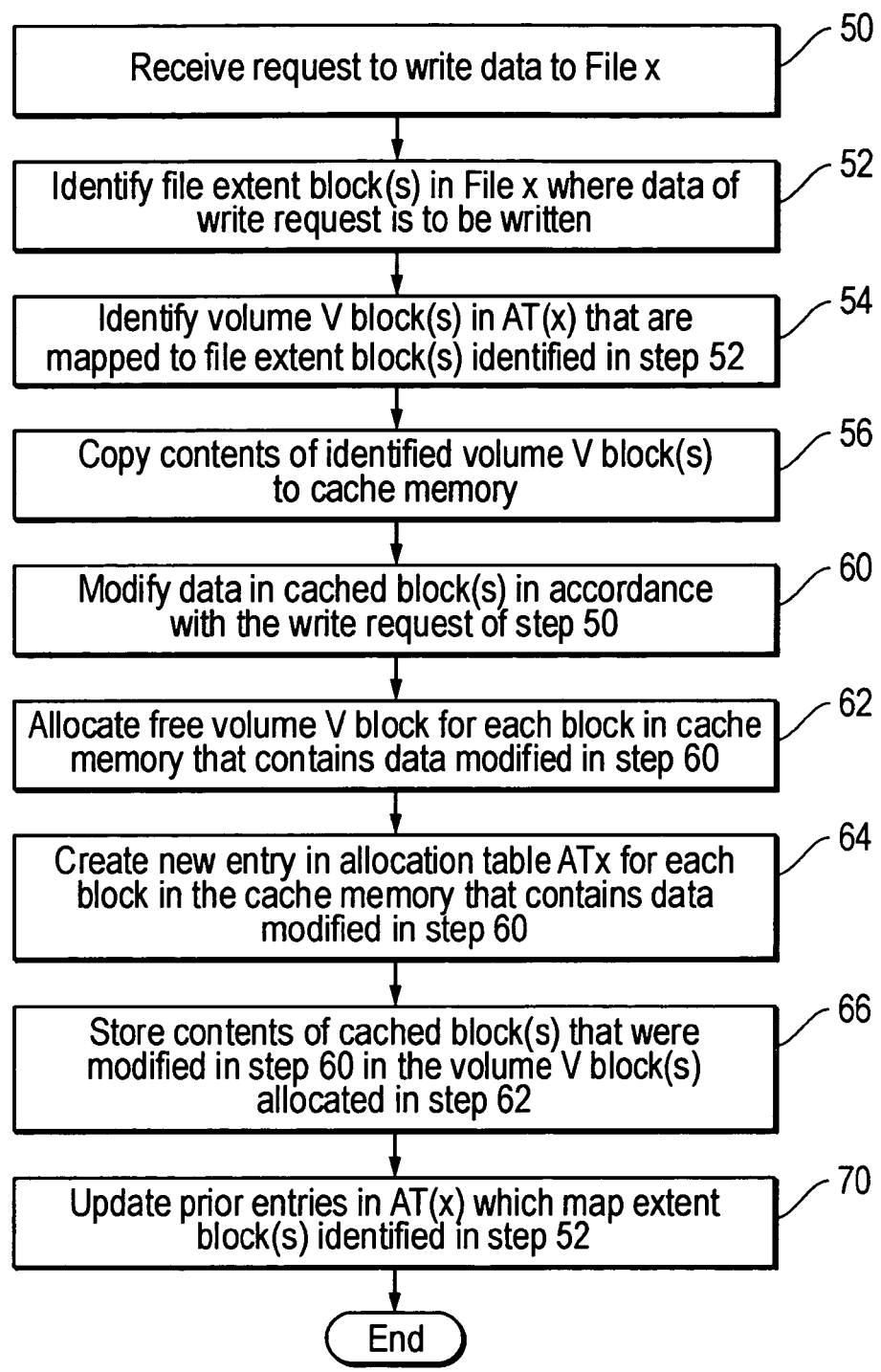
FIG. 5 illustrates relevant aspects of a process for writing data to a file in accordance with one embodiment of the present invention.

FIG. 5 illustrates relevant operational aspects that may be performed by file system manager 22 in response to receiving a request to write or modify data of File x. File system manager 22, in the process shown in FIG. 5, redirects the block extent of a file when data of that block extent is modified in accordance with a write request as will be more fully described below. The process in FIG. 5 begins when the write request is received from application 20. In step 52 file system manager 22 may access metadata (not shown) for File x in order to identify by number the file extent block(s) that contain the data to be modified by the request received in step 50. The extent for File x may be insufficient to store all data of the write request. In this situation, file system manager 22 may allocate one or more new, additional extent blocks to File x and update the file's metadata accordingly. Volume manager 24 may also allocate one or more blocks of volume V from its free volume block list. File system manager 22 may then create a new entry in allocation table AT(x) for each newly allocated extent block. Each new entry will map an extent block newly allocated by file system manager 22 to a block of volume V newly allocated by volume manager 24. Moreover, each new entry will include current value C set to logical 1, and time stamp TS set to the time at which file system manager 22 created the entry.

In step 54, file system manager 22 may access the allocation table AT(x) contained within allocation table memory 30 using the extent block(s) identified in step 52 in order to identify the block(s) by number of volume V mapped thereto. If more than one entry exists in AT(x) for an extent block identified in step 52, file system manager 22 may read the identity (i.e., block number) of the volume block in the allocation table AT(x) entry having current value C set to logical 1. In this embodiment, only one of the several entries for an extent block in AT(x) will have current value C set to logical 1. Once the block(s) of volume V are identified in step 54, the contents of the identified block(s) of volume V are copied to a cache (not shown) of computer system 12 (if not already in the cache) as shown in step 56. In step 60, data in the block(s) of volume V copied to the cache is modified in accordance with the write request of step 50. Thereafter, in step 62 volume manager 24 allocates a free block of volume V for each of the data blocks in the cache that contains data that was modified in step 60. In step 64, a new entry is created in allocation table AT(x) for each block in the cache that contains data that was modified in step 60. Each entry created in step 64 will map a file extent block identified in step 52 with a respective block of volume V that was allocated in step 62. Each entry created in step 64 will have its current value C set to logical 1 and its time stamp TS set to the time of the entry's creation. In step 66, the contents of the block(s) in the cache containing data that was modified in step 60 may be written to the block(s) of volume V allocated in step 62. Then in step 70, the current value C is set to logical 0 in all prior AT(x) entries (i.e., entries created before those of step 64) that map extent block(s) identified in step 52. When the process of FIG. 5 ends, only one of two or more entries in AT(x) that maps an extent should have a current value C set to logical 1.

The process as shown in FIG. 5 implements one embodiment of extent block redirect in response to file system manager 22 receiving a write request. Because the extent blocks are redirected during a write request, file system manager 22 can use the allocation tables to correctly identify blocks of volume V that contain the most recent version of file data when file system manager 22 implements subsequent read or write requests while preserving prior versions of that data. The prior versions of the data are preserved to enable a fast restoration process (relative to prior art restoration methods using full and/or incremental backup copies) that is more fully described below.

FIGS. 3B-3F illustrate Files m and n and their respective allocation tables ATm and ATn as they are modified in accordance with the process shown in FIG. 5. FIGS. 2B-2F illustrate volume V as it is modified in accordance with the process shown in FIG. 5. More particularly, at time T=T1, where T1 occurs after time T=T0, application program 20 generates a request to write or modify data B0 in extent block 2 of File m. FIG. 3B shows the changes to File m and allocation table ATm of FIG. 3A after implementing the request in accordance with the process shown in FIG. 5. As can be seen in FIG. 3B, B0 is replaced with B1, where B1 designates data B0 after data B0 is modified. FIG. 3B shows entry 4 added by file system manager 22 to allocation table ATm of FIG. 3A. Entry 4 indicates that extent block 2 of File m is mapped to volume V, block 6. The current value C in entry 4 is set to logical 1 thus indicating that volume V, block 6 contains the current data (i.e., B1) for extent block 2 of File m. The current value C in entry 2 of ATm in FIG. 3A has been switched from logical 1 to logical 0 as shown in FIG. 3B, thus indicating that volume V, block 2 contains a prior version (i.e., B0) of the data for extent block 2. Lastly, entry 4 has its time stamp TS set to T1, although in reality entry 4 was created slightly after time T=T1. FIG. 2B illustrates volume V, after storing data B1 in block 6 thereof.

At time T=T2, where T2 occurs after T1, application program 20 generates a request to write or modify data of File n. The request when completed will modify data E0 of File n. Moreover, File n must be extended to accommodate additional data designated F of the write request. File system manager 22 extends File n by allocating extent block 3 thereto. FIG. 3C shows File n of FIG. 3B with the addition of extent block 3. FIG. 3C also shows the effects on File n and allocation table ATn of FIG. 3B after implementing the request to write or modify data. As can be seen in FIG. 3C, E0 is replaced with E1, where E1 designates data E0 after data E0 is modified. FIG. 3C shows that file manager 22 has added entries 3 and 4 to allocation table ATn of FIG. 3B. Entry 3 indicates that extent block 2 of File n is mapped to volume V, block 7, and entry 4 indicates that newly allocated extent block 3 is mapped to volume V, block 8. The current value C in both entries 3 and 4 are set to logical 1, thus indicating that volume V, blocks 7 and 8 contain the current data for extent blocks 2 and 3, respectively, of File n. The current value C in entry 2 of ATn in FIG. 3B has been switched from logical 1 to logical 0 as shown in FIG. 3C, thus indicating that volume V, block 5 contains a prior version (i.e., E0) of data for extent block 2. Lastly, entries 3 and 4 of ATn as shown in FIG. 3C have their time stamps TS set to T2, although in reality entries 3 and 4 were created slightly after time T=T2. FIG. 2C illustrates volume V, after storing data E1 and F in blocks 7 and 8, respectively, thereof.

At time T=T3, where T3 occurs after time T=T2, application program 20 generates a request to write or modify data A0 contained in File m. FIG. 3D shows the modifications to File m and allocation table ATm of FIG. 3C after implementing the request in accordance with the process shown in FIG. 5. As can be seen in FIG. 3D, A0 is replaced with A1, where A1 designates data A0 after data A0 is modified. FIG. 3D shows entry 5 has been added to allocation table ATm of FIG. 3C. Entry 5 indicates that extent block 1 of File m is mapped to volume V, block 9. The current value C in entry 5 is set to logical 1, thus indicating that volume V, block 9 contains the current data for extent block 1 of File m. The current value C in entry 1 of FIG. 3C (or FIG. 3B) has been switched from logical 1 to logical 0 as shown in FIG. 3D, thus indicating that volume V, block 1 contains a prior version (i.e., A0) of the data for extent block 1. Lastly, entry 5 has its time stamp TS set to T3, although in reality, entry 5 was created slightly after time T=T3. FIG. 2D illustrates volume V, after storing data A1 in block 9 thereof.

At time T=T4, where T4 occurs after time T=T3, application program 20 generates a request to write or modify data B1 contained in File m. FIG. 3E shows File m and allocation table ATm of FIG. 3D after implementing the request to modify data B1 in extent block 2 of File m in accordance with the process shown in FIG. 5. As can be seen in FIG. 3E, B1 is replaced with B2, where B2 designates data B1 after data B1 is modified in accordance with the write request generated at time T=T4. For purposes of explanation, it will be presumed the write request was generated in error at time T=T4, thereby corrupting the data contained within File m. FIG. 3E shows entry 6 has been added to allocation table ATm of FIG. 3D. Entry 6 indicates that extent block 2 of File m is mapped to volume V, block 10. The current value C in entry 6 is set to logical 1, thus indicating that volume V, block 10 contains the current (albeit corrupted) data for extent block 2 of File m. The current value C in entry 4 of ATm in FIG. 3D has been switched to logical 1 to logical 0 as shown in FIG. 3E, thus indicating that volume V, block 6 contains a prior version, (i.e., B1) of the data for extent block 2. Lastly, entry 6 has its time stamp TS set to T4, although in reality, entry 6 was created slightly after time T=T4. FIG. 2E illustrates volume V, after storing data B2 in block 10 thereof.

At time T=T5, where T5 occurs after time T=T4, application program 20 generates a request to write or modify data F contained in File n. FIG. 3F shows File n and allocation table ATn of FIG. 3E after implementing the request to modify data F in extent block 3 of File n in accordance with the process shown in FIG. 5. As can be seen in FIG. 3F, F is replaced with F1, where F1 designates data F after data F is modified in accordance with the write request generated at time T=T5. FIG. 3F shows entry 5 has been added to allocation table ATn of FIG. 3E. Entry 5 indicates that extent block 3 of File n is mapped to volume V, block 11. The current value C in entry 5 is set to logical 1, thus indicating that volume V, block 11 contains the current data for extent block 3 of File n. The current value C in entry 4 in FIG. 3E has been switched from logical 1 to logical 0 as shown in FIG. 3F, thus indicating that volume V, block 8 contains a prior version (i.e., F) of the data for extent block 3. Lastly, entry 5 has its time stamp TS set to T5, although in reality, entry 5 was created slightly after time T=T5. FIG. 2F illustrates volume V after storing data F1 in block 11 thereof.

As noted above, the data volume V was corrupted at time $T_4$ when data B1 was modified in error. After a corrupting event, restore manager 26 can restore data volume V (and thus file system F) to a consistent data state that existed prior to the corrupting event in accordance with the process shown in FIG. 6. Other restore processes are contemplated. The process in FIG. 6 starts when a restore time TR is identified. Restore time TR represents a prior time when volume V is known to be consistent. In the illustrated example above, TR could be identified and set to T3 since the corrupting event occurred at time T=T4. Once TR is established, an instruction may be generated to restore volume V to the data state existing at restore time TR. In steps 92 and 94, restore manager 26 may set dummy variable x and dummy variable y to 1. In step 96, restore manager 26 can access allocation table AT(x) to determine whether extent block(y) has more than one entry. If there is more than one entry in AT(x) which maps extent block(y), the process may proceed to step 100 where the current value C is set to logical 0 for each entry of extent block(y) in allocation table AT(X). Thereafter, in step 102, restore manager 26 sets the current value C to logical 1 for the entry in AT(X) that maps extent block(y) and contains a time stamp that is nearest in time and earlier in time than TR. In step 104, variable y is compared to $y_{max}$, where $y_{max}$ is the total number of extent blocks contained within File x. If less than all extent blocks in File x have been checked in accordance with step 96, the process proceeds to step 106 where y is incremented by 1. Thereafter, step 96 is repeated. However, if all extent blocks have been checked, then the process proceeds to step 110 where restore manager 26 determines whether all allocation tables in memory 30 have been processed in accordance with the step(s) of FIG. 6. More specifically, restore manager compares x to $x_{max}$, where x is the total number of allocation tables contained within the allocation table memory 30. When all the allocation tables have been processed, the process ends. Otherwise, x is incremented by 1 in step 112 and step 94 is repeated for the next allocation table AT(x). Once the process of FIG. 6 ends, subsequent requests to read data from or write data to File x generated by application program 20 are implemented in accordance with the processes shown in FIG. 4 and FIG. 5.

Figure 6:
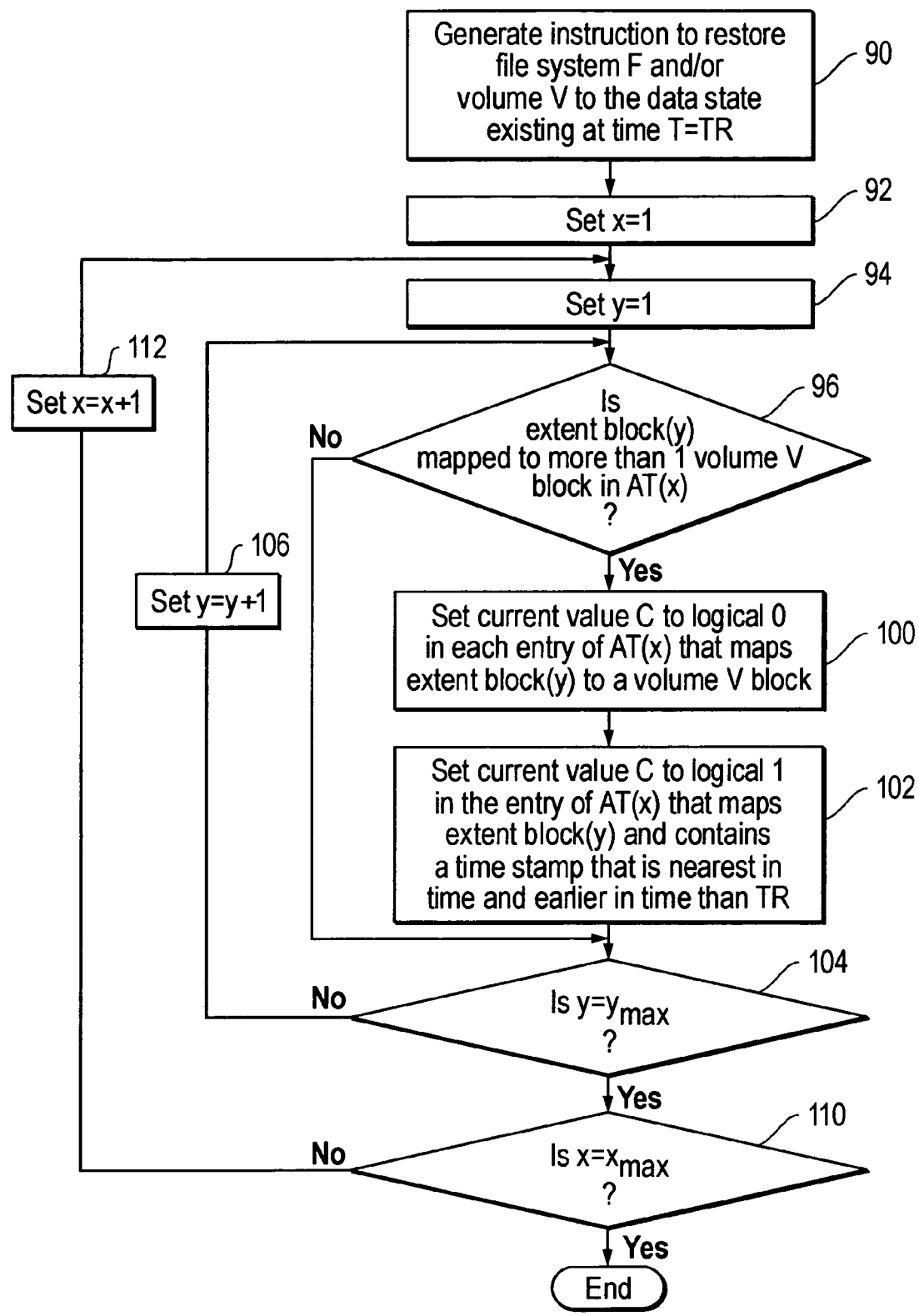
FIG. 6 illustrates relevant aspects of restoring a file system in accordance with one embodiment of the present invention.

Once the process shown in FIG. 6 has completed, file system F (including example Files m and n) are restored to a known, consistent state that existed prior to the data corrupting event. FIG. 3G illustrates Files m and n and allocation tables ATm and ATn of FIG. 3E after they are modified in accordance with the process shown in FIG. 6. More particularly, at time T=T6, an instruction is generated to restore file system F to the data state that existed at time T=T3 (i.e., TR is set to T3). It is noted that if the identity is known of a file (e.g., File m) containing corrupted data, that file can be restored by itself simply by implementing steps 94-104. For example, with AT(x) set to ATm, corrupted File m could be restored to the state shown in FIG. 3G, and ATm could be modified to the state shown in FIG. 3G without having to restore File n.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   creating an allocation table, wherein
      the allocation table comprises a first entry associated with a first memory block, and
      the first entry comprises a first flag indicating whether data in the first memory block is current;
   mapping a data object to the first memory block;
   updating the allocation table to reflect the mapping the data object to the first memory block, wherein the updating comprises
      updating the first entry to indicate the first memory block is current;
   creating a first copy of data contents of the first memory block;
   modifying the first copy to create a first modified data;
   allocating a second memory block in response to the modifying the first copy;
   storing the first modified data in the second memory block;
   remapping the data object to the second memory block; and
   wherein
      the first memory block is distinct from the second memory block.

2. The method of claim 1 wherein the first copy is created in response to generating a first request to modify data of the data object.

3. The method of claim 1 wherein
   the first and the second memory blocks are stored on a same volume.

4. The method of claim 1 further comprising:
   accessing the first memory block in response to receiving a request to read data of the data object if the request is received before the data object is remapped to the second memory block; and
   accessing the second memory block in response to receiving the request to read data of the data object if the request is received after the data object is remapped to the second memory block.

5. The method of claim 1:
   wherein mapping the data object to the first memory block comprises creating the first entry, wherein the first entry maps the data object to the first memory block; and
   wherein remapping the data object to the second memory block comprises creating a second entry, wherein the second entry remaps the data object to the second memory block.

6. The method of claim 5, wherein the updating further comprises:
   setting the first value to a second state to indicate that the first memory block does not store the current version of data of the data object, wherein
      before remapping the data object to the second memory block, the first entry comprises a first value set to a first state to indicate the first memory block stores a current version of data of the data object, and
      the second entry comprises a second value set to the first state to indicate that the second memory block stores the current version of data of the data object.

7. The method of claim 6 further comprising:
   resetting the first value to the first state to indicate that the first memory block stores the current version of data of the data object; and
   setting the second value to the second state to indicate that the second memory block does not store the current version of data of the data object.

8. A memory that stores instructions executable by a computer system, wherein the computer system implements a method in response to executing the instructions, the method comprising:
   creating an allocation table, wherein
      the allocation table comprises a first entry associated with a first memory block, and
      the first entry comprises a first flag indicating whether data in the first memory block is current;
   mapping a data object to the first memory block;
   updating the allocation table to reflect the mapping the data object to the first memory block, wherein the updating comprises
      updating the first entry to indicate the first memory block is current;
   creating a first copy of data contents of the first memory block;
   modifying the first copy to create a first modified data;
   allocating a second memory block in response to the modifying the first copy;
   storing the first modified data in the second memory block;
   remapping the data object to the second memory block; and
   wherein
      the first memory block is distinct from the second memory block.

9. The memory of claim 8 wherein the first copy is created in response to generating a first request to modify data of the data object.

10. The memory of claim 8 wherein
    the first and the second memory blocks are stored on a same volume.

11. The memory of claim 8 wherein the method further comprises:
    accessing the first memory block in response to receiving a request to read data of the data object if the request is received before the data object is remapped to the second memory block; and
    accessing the second memory block in response to receiving the request to read data of the data object if the request is received after the data object is remapped to the second memory block.

12. The memory of claim 8:
    wherein mapping the data object to the first memory block comprises creating a first entry, wherein the first entry maps the data object to the first memory block; and
    wherein remapping the data object to the second memory block comprises creating a second entry, wherein the second entry remaps the data object to the second memory block.

13. The memory of claim 12, wherein the updating further comprises:
    setting the first value to a second state to indicate that the first memory block does not store the current version of data of the data object, wherein
       before remapping the data object to the second memory block, the first entry comprises a first value set to a first state to indicate the first memory block stores a current version of data of the data object, and
       the second entry comprises a second value set to the first state to indicate that the second memory block stores the current version of data of the data object.

14. The memory of claim 12 wherein the method further comprises:
  resetting the first value to the first state to indicate that the first memory block stores the current version of data of the data object; and
  setting the second value to the second state to indicate that the second memory block does not store the current version of data of the data object.

15. A system comprising:
a computer system coupled to a memory device;
wherein the computer system comprises a memory that stores executable instructions, wherein the computer system implements a method in response to executing the instructions, the method comprising:
  creating an allocation table, wherein
    the allocation table comprises a first entry associated with a first memory block, and
    the first entry comprises a first flag indicating whether data in the first memory block is current;
  mapping a data object to the first memory block;
  updating the allocation table to reflect the mapping the data object to the first memory block, wherein the updating comprises
    updating the first entry to indicate the first memory block is current;
  creating a first copy of data contents of the first memory block;
  modifying the first copy to create a first modified data;
  allocating a second memory block in response to the modifying the first copy;
  storing the first modified data in the second memory block;
  remapping the data object to the second memory block;
  updating the allocation table to reflect the remapping the data object to the second memory block, wherein the updating comprises
    creating a second entry in the allocation table associated with the second memory block,
    updating the first entry to indicate the first memory block is not current, and
    updating the second entry to indicate the second memory block is current;
  creating a second copy of the first modified data;
  modifying the second copy to create a second modified data;
  allocating a third memory block in response to the modifying the second copy;
  storing the second modified data in the third memory block;
  remapping the data object to the third memory block;
  updating the allocation table to reflect the mapping the data object to the third memory block, wherein the updating comprises
    creating a third entry in the allocation table associated with the third memory block,
    updating the second entry to indicate the second memory block is not current, and
    updating the third entry to indicate the third memory block is current; and
  wherein
    the first memory block is distinct from the second memory block and the second memory block is distinct from the third memory block.

16. The system of claim 15 wherein the first copy is created in response to a first request to modify data of the data object.

17. The system of claim 15 wherein the method further comprises:
  accessing the first memory block in response to receiving a request to read data of the data object if the request is received before the data object is remapped to the second memory block;
  accessing the second memory block in response to receiving the request to read data of the data object if the request is received after the data object is remapped to the second memory block and if the request is received before the data object is remapped to the third memory block; and
  accessing the third memory block in response to receiving the request to read data of the data object if the request is received after the data object is remapped to the third memory block.

18. A method comprising:
creating an allocation table corresponding to a file, wherein
  the file comprises a first memory block, and
  the allocation table comprises a first entry associated with the first memory block, and
  the first entry comprises a first flag indicating whether the first memory block is current;
mapping a data object to the first memory block;
updating the allocation table to reflect the mapping the data object to the first memory block,
  wherein the updating comprises
    updating the first entry to indicate the first memory block is current;
creating a first copy of data contents of the first memory block;
modifying the first copy to create a first modified data;
allocating a second memory block in response to the modifying the first copy;
storing the first modified data in the second memory block;
remapping the data object to the second memory block;
updating the allocation table to reflect the remapping the data object to the second memory block, wherein the updating comprises
  creating a second entry in the allocation table associated with the second memory block,
  updating the first entry to indicate the first memory block is not current, and
  updating the second entry to indicate the second memory block is current;
creating a second copy of the first modified data;
modifying the second copy to create a second modified data;
allocating a third memory block in response to the modifying the second copy;
storing the second modified data in the third memory block;
remapping the data object to the third memory block;
updating the allocation table to reflect the mapping the data object to the third memory block,
  wherein the updating comprises
    creating a third entry in the allocation table associated with the third memory block,
    updating the second entry to indicate the second memory block is not current, and
    updating the third entry to indicate the third memory block is current; and
wherein
  the first memory block is distinct from the second memory block and the second memory block is distinct from the third memory block, and
  after each remapping, the data object is mapped to a most recently allocated memory block.

19. The method of claim 18 further comprising:
accessing the third memory block in response to receiving an instruction for accessing the data object.
20. The method of claim 18 wherein
the first copy is created in response to generating a first request to modify data of the data object.
21. The method of claim 18 wherein
the first, second, and third memory blocks are stored on the same volume.
22. The method of claim 18 further comprising:
accessing the first memory block in response to receiving a request to read data of the data object if the request is received before the data object is remapped to the second memory block;
accessing the second memory block in response to receiving the request to read data of the data object if the request is received after the data object is remapped to the second memory block and if the request is received before the data object is remapped to the third memory block; and
accessing the third memory block in response to receiving the request to read data of the data object if the request is received after the data object is remapped to the third memory block.
23. The method of claim 18:
wherein mapping the data object to the first memory block comprises creating the first entry, wherein the first entry maps the data object to the first memory block;
wherein remapping the data object to the second memory block comprises creating a second entry, wherein the second entry remaps the data object to the second memory block; and
wherein remapping the data object to the third memory block comprises creating a third entry, wherein the third entry remaps the data object to the third memory block.
24. The method of claim 23 wherein the updating further comprises:
setting the first value to a second state to indicate that the first memory block does not store the current version of data of the data object, wherein
before remapping the data object to the second memory block, the first entry comprises the first value set to a first state to indicate the first memory block stores a current version of data of the data object, and
the second entry comprises a second value set to the first state to indicate that the second memory block stores the current version of data of the data object.
25. The method of claim 24 further comprising:
resetting the first value to the first state to indicate that the first memory block stores the current version of data of the data object; and
setting the second value to the second state to indicate that the second memory block does not store the current version of data of the data object.
26. A memory that stores instructions executable by a computer system, wherein the computer system implements a method in response to executing the instructions, the method comprising:
creating an allocation table corresponding to a file, wherein
the file comprises a first memory block, and
the allocation table comprises a first entry associated with the first memory block, and
the first entry comprises a first flag indicating whether the first memory block is current;
mapping a data object to the first memory block;
updating the allocation table to reflect the mapping the data object to the first memory block,
wherein the updating comprises
updating the first entry to indicate the first memory block is current;
creating a first copy of data contents of the first memory block;
modifying the first copy to create a first modified data;
allocating a second memory block in response to the modifying the first copy;
storing the first modified data in the second memory block;
remapping the data object to the second memory block;
updating the allocation table to reflect the remapping the data object to the second memory block, wherein the updating comprises
creating a second entry in the allocation table associated with the second memory block,
updating the first entry to indicate the first memory block is not current, and
updating the second entry to indicate the second memory block is current;
creating a second copy of the first modified data;
modifying the second copy to create a second modified data;
allocating a third memory block in response to the modifying the second copy;
storing the second modified data in the third memory block;
remapping the data object to the third memory block;
updating the allocation table to reflect the mapping the data object to the third memory block,
wherein the updating comprises
creating a third entry in the allocation table associated with the third memory block,
updating the second entry to indicate the second memory block is not current, and
updating the third entry to indicate the third memory block is current; and
wherein
the first memory block is distinct from the second memory block and the second memory block is distinct from the third memory block, and
after each remapping, the data object is mapped to a most recently allocated memory block.
27. The memory of claim 26 wherein
the first copy is created in response to generating a first request to modify data of the data object.
28. The memory of claim 26 wherein
the first, second, and third memory blocks are stored on the same volume.
29. The memory of claim 26 wherein the method further comprises:
accessing the first memory block in response to receiving a request to read data of the data object if the request is received before the data object is remapped to the second memory block;
accessing the second memory block in response to receiving the request to read data of the data object if the request is received after the data object is remapped to the second memory block and if the request is received before the data object is remapped to the third memory block; and
accessing the third memory block in response to receiving the request to read data of the data object if the request is received after the data object is remapped to the third memory block.

30. The memory of claim 26:
wherein mapping the data object to the first memory block comprises creating the first entry, wherein the first entry maps the data object to the first memory block;
wherein remapping the data object to the second memory block comprises creating a second entry, wherein the second entry remaps the data object to the second memory block; and
wherein remapping the data object to the third memory block comprises creating a third entry, wherein the third entry remaps the data object to the third memory block.

31. The memory of claim 30 wherein the updating further comprises:
setting the first value to a second state to indicate that the first memory block does not store the current version of data of the data object, wherein
before remapping the data object to the second memory block, the first entry comprises the first value set to a first state to indicate the first memory block stores a current version of data of the data object, and
the second entry comprises a second value set to the first state to indicate that the second memory block stores the current version of data of the data object.

32. The memory of claim 31 wherein the method further comprises:
resetting the first value to the first state to indicate that the first memory block stores the current version of data of the data object; and
setting the second value to the second state to indicate that the second memory block does not store the current version of data of the data object.

33. The memory of claim 26 wherein the method further comprises:
accessing the third memory block in response to receiving an instruction for accessing the data object.

* * * * *